UNITED STATES PATENT OFFICE.

THEODORE BOSSHARD, OF BROOKLYN, NEW YORK.

WATERPROOFING COMPOSITION.

1,383,068.     Specification of Letters Patent.     Patented June 28, 1921.

No Drawing.     Application filed November 13, 1920. Serial No. 423,874.

*To all whom it may concern:*

Be it known that I, THEODORE BOSSHARD, a citizen of the United States, and resident of the city of New York borough of Brooklyn, in the county of Kings and State of New York, have invented a new and Improved Waterprofing Composition, of which the following is a full, clear, and exact description.

My invention relates to a composition, and aims to provide a substance of this character, and method of application, to substances which are to be impregnated, or coated therewith, which will render these substances substantially water proof.

It is well appreciated that confectioners quite often utilize a bag, or receiving element of woven material for use as a food covering, in the nature of a bag for candy, cake, etc. These containers or receivers have presented one outstanding defect in that the moisture in the atmosphere has quickly permeated the contents of the same, resulting in a loss of freshness.

With this in view, it has been proposed to provide a rubber liner for these receptacles, but this has presented objectionable features, in that although the rubber liner has precluded any danger of the entrance of moisture, the odor of the same was far from pleasant, and eventually permeated the entire contents of the receptacle.

Also, aside from this latter objection, the rubber was liable to become brittle and crack, thus destroying the purpose for which the liner was intended.

With this in view, I have provided a composition adapted to permit of the manipulation of fabric to render the same entirely moisture proof, and which is primarily intended for use in connection with that class of receptacle specified, but not necessarily limited to this adaption.

A further object of my invention is the provision of a composition which, when once in applied position, will not crack or otherwise permit of a crevice coming into existence, allowing the outside atmosphere to enter the interior of the cloth receptacle, when it is used in this connection.

A still further object of my invention is the provision of a composition which will be entirely non-odorous so that the objections incident to the water proofing of receptacles adapted to contain food, are eliminated.

With this in view, I utilize gelatin, water and glycerin in the proportions of ½ pound gelatin, 18 ounces of water, and 9 ounces glycerin.

The first step of compounding consists in adding any specified amount of water to the gelatin. This mixture is then allowed to soak for approximately three hours, subsequent to which the same is subjected to the action of heat to produce a dissolving of the gelatin, such heat being preferably imparted to the mixture by placing the same in a double boiler, thus maintaining the temperature below 212° Fahrenheit.

To the emulsion thus prepared, glycerin is now added, and the entire mixture is subjected to a thorough stirring action. This mixture of ingredients may now be applied to the cloth to be water-proofed, and penetrates the fibers of the same, as well as forming a coating upon the exterior face to which it is applied. It is also obvious that as many additional coats of the mixture as necessary may be added to produce the desired thickness of coat.

After the final coating has been applied approximately 1 hour is permitted to elapse, subsequent to which I preferably apply to the exterior face of the coating, a film of pliable varnish (gum varnish). This varnish is applied by wiping it on with a rag, subsequent to which it is permitted to stand until thoroughly dry.

Cloth treated in the manner specified, may be washed in cold water, is air, dust and water proof, and is particularly adapted as aforestated, for use as an enveloping member for foods, but not necessarily limited to this adaption.

Obviously the method of application, and ingredients of the mixture are susceptible to variation within the scope of my claim, which is—

A water proofing composition, including gelatin, water and glycerin in the proportions of one-half pound gelatin, eighteen ounces of water and nine ounces of glycerin.

THEODORE BOSSHARD.